United States Patent Office 3,713,011
Patented Jan. 23, 1973

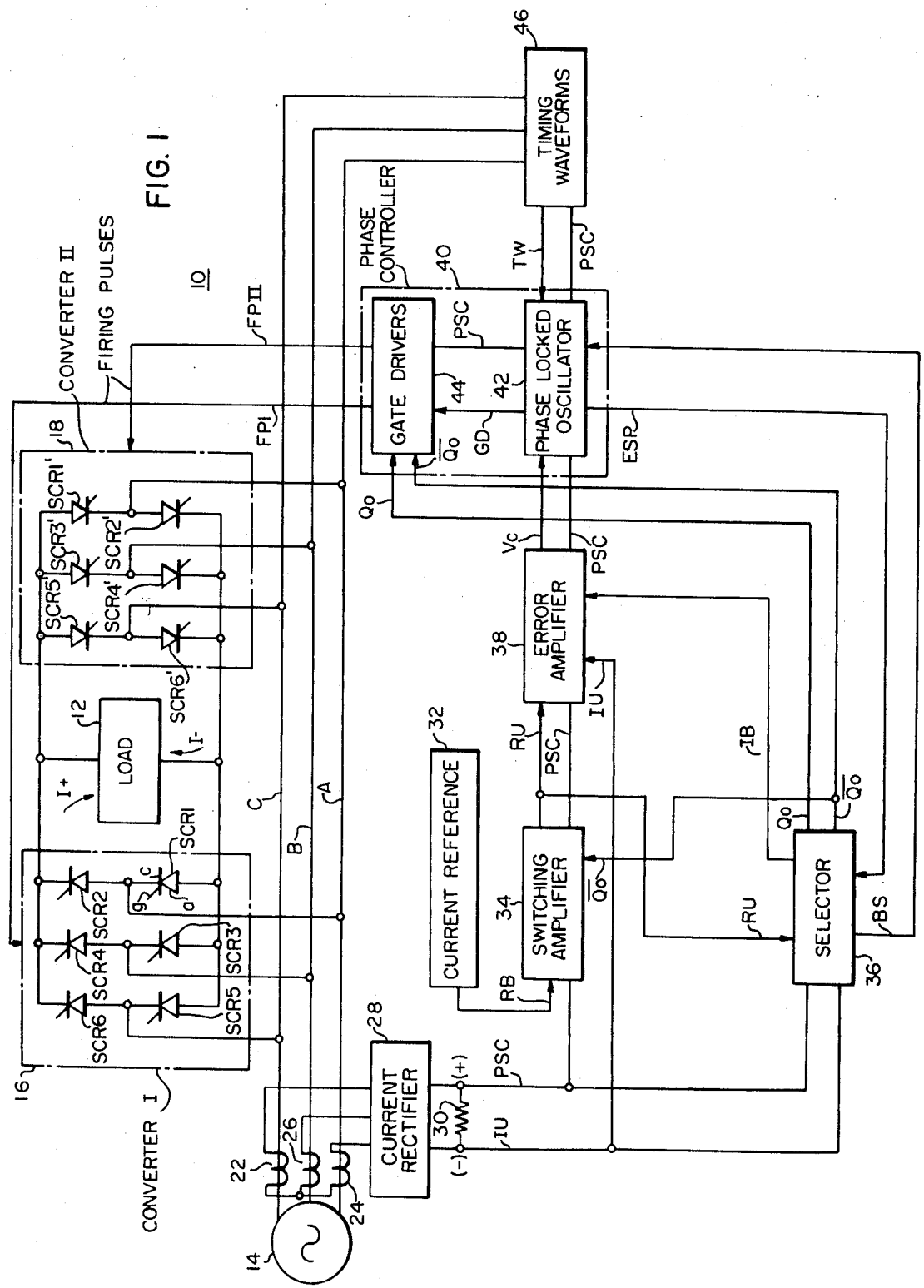

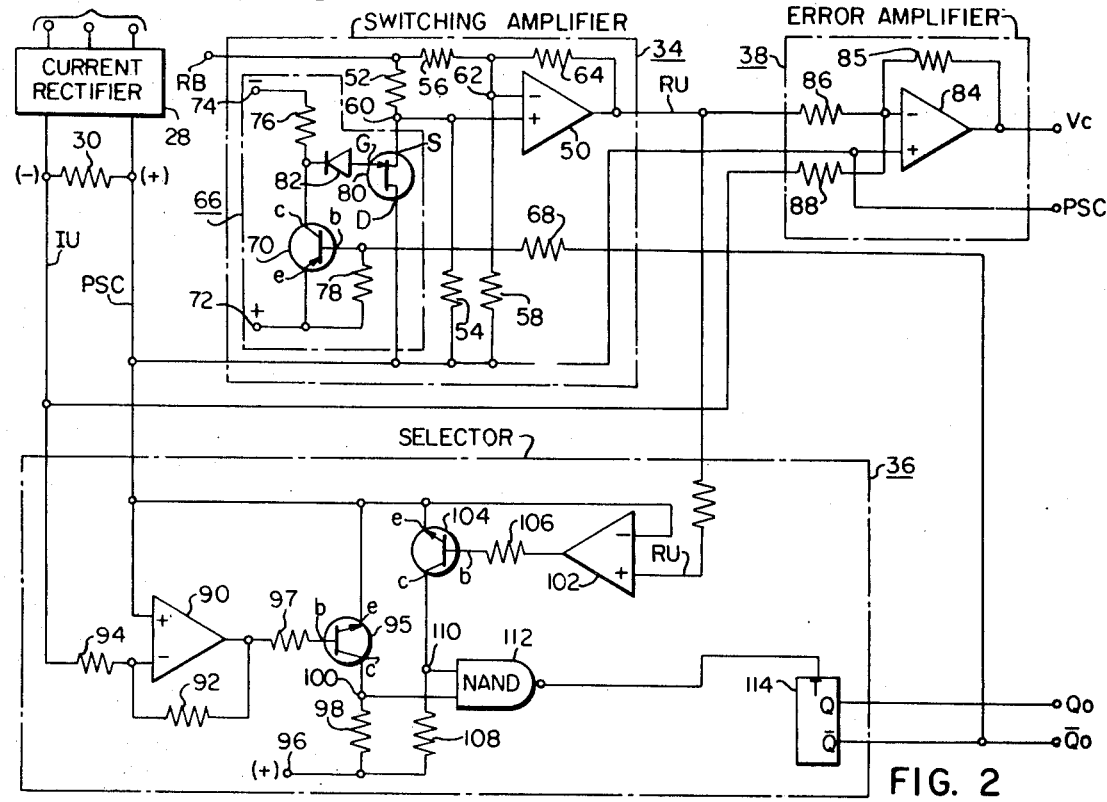
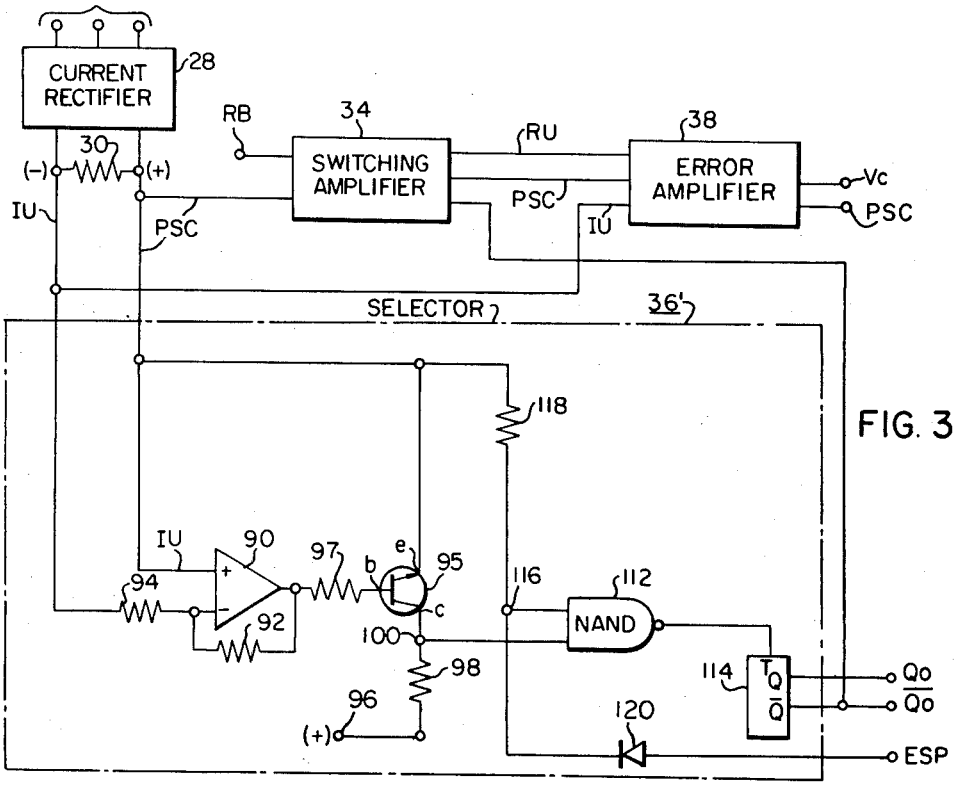

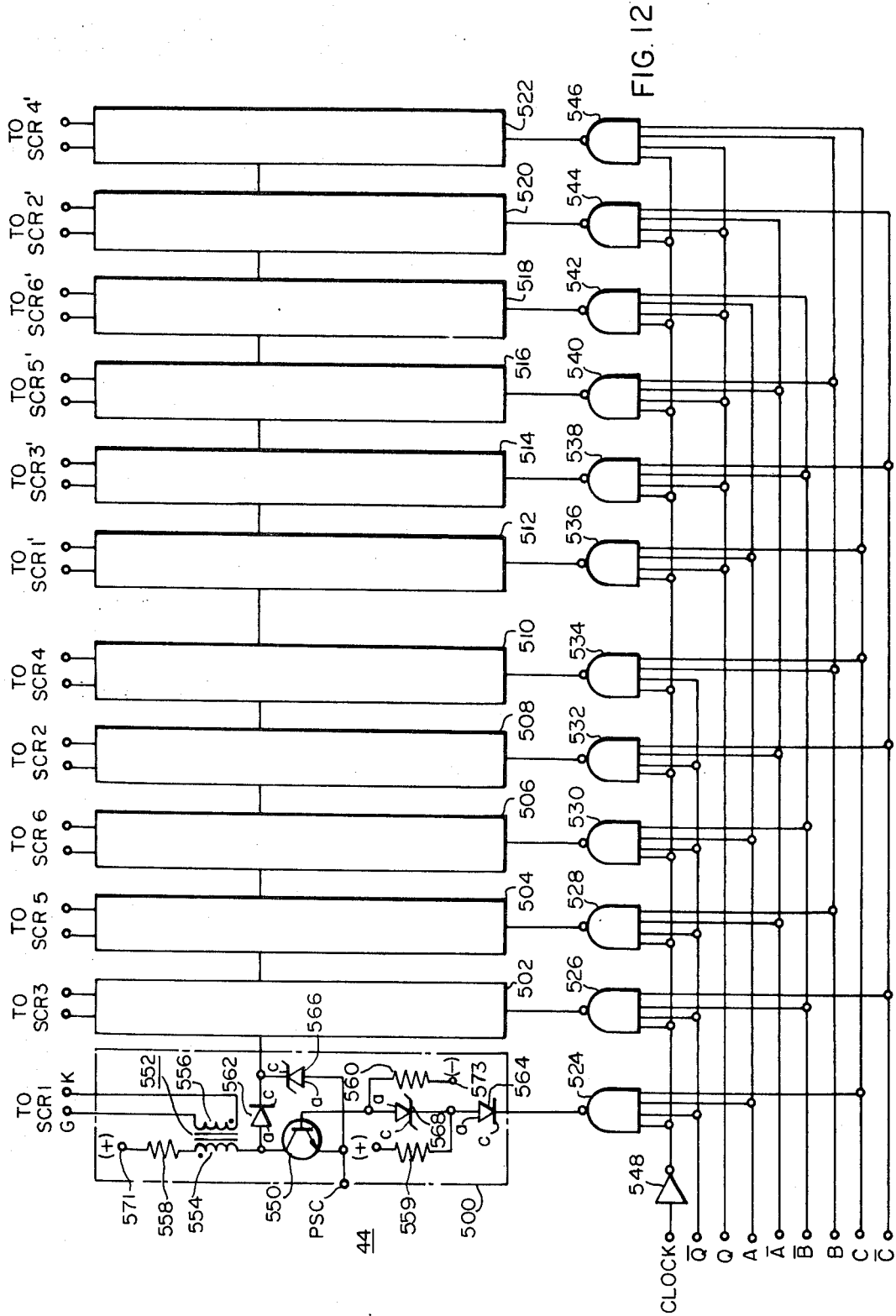

3,713,011
CONVERTER APPARATUS
Frederick O. Johnson, Monroeville, and Theodore M. Heinrich, Murrysville, Pa., assignors to Westinghouse Electric Corporation, Pittsburgh, Pa.
Filed Mar. 28, 1972, Ser. No. 238,916
Int. Cl. H02m 7/12
U.S. Cl. 321—27 R                17 Claims

ABSTRACT OF THE DISCLOSURE

Converter apparatus includes a power converter having controlled rectifier devices connected to interchange electrical power between a source of alternating potential and a direct current load circuit, a phase controller for controlling the conduction angle of the controlled rectifier devices, and circuitry for maintaining synchronous operation between the phase controller and the power converter. The circuitry for maintaining synchronous operation constrains the conduction angle between predetermined end stops, by providing a composite end stop signal, and comparing it with predetermined threshold levels. The composite end stop signal is made up of segments selected from a plurality of timing waveforms which are responsive to the source of alternating potential, with the segments selected being determined by the conduction angle.

CROSS-REFERENCE TO RELATED APPLICATION

Certain of the apparatus discussed but not claimed in this application, is claimed in concurrently filed application Ser. No. 238,917, filed in the name of F. O. Johnson, and entitled "Converter Apparatus," which application is assigned to the same assignee as the present application.

BACKGROUND OF THE INVENTION

Field of the invention

The invention relates in general to converter apparatus, and more specifically to power converter apparatus for interchanging electrical energy between alternating and direct current circuits.

Description of the prior art

Converter apparatus of the type which utilizes controlled rectifier devices, such as thyristors, connected to interchange electrical energy between alternating and direct current circuits, require some type of phase controller for controlling the conduction angle of the controlled rectifier devices. The conduction angle is controlled to regulate a predetermined parameter of the power converter, such as load current or load voltage.

It is important for proper operation of the converter apparatus that synchronous operation be maintained between the phase controller and power converter. In other words, the conduction angle of the gate drive signals applied to the controlled rectifier devices of the power converter must be constrained within predetermined limits, which will be referred to as end stops.

Prior art arrangements for providing the end stop functions are in general very complex, often resorting to a comparator for each channel. Further, sensitivity to "noise" is often a problem, and the filtering resorted to to prevent false triggering degrades the accuracy of the circuit.

Thus, it would be desirable to provide new and improved converter apparatus in which the arrangement for constraining the conduction angle is less complex, requiring only a single comparator for each end stop instead of one for each channel. Further, it would be desirable to provide an arrangement which has reduced sensitivity to noise, without requiring excessive filtering with its concomitant degradation of performance.

SUMMARY OF THE INVENTION

Briefly, the present invention is new and improved converter apparatus of the type which includes controlled rectifier devices connected to interchange electrical power between alternating and direct current circuits. The converter includes a phase controller for controlling the conduction angle of the controlled rectifier devices in response to an error signal which indicates any difference between the actual operation of the converter apparatus and the desired operation.

The phase controller includes end stop means for constraining the conduction angle between predetermined rectification and inversion end stops or limits. The end stop means includes means for providing a plurality of timing waveforms in response to the source of alternating potential, and means responsive to the conduction angle and the timing waveforms for providing a single composite end stop signal which is used to control all channels of the converter apparatus. The composite end stop signal is formed of segments of the plurality of timing waveforms, with the segments selected being determined by the conduction angle.

The end stop signal is applied to first and second threshold circuits, which detect when the conduction angle reaches their respective limits, and holds the conduction angle at these limits as long as the error signal is requesting operation beyond the limit.

The timing waveforms, being proportional to the actual alternating current line voltages for the power converter, accurately represent the actual voltage available for commutating the controlled rectifier devices of the converter.

Noise sensitivity is reduced, without filtering, by incorporating a delay feature which reduces false triggering due to noise.

In a preferred implementation of the invention, the end stop circuitry includes oscillator means which generates clock signals at a rate which is a predetermined multiple of the source frequency when the error signal is zero, and which increases and decreases its rate for negative and positive error signals, respectively, according to the magnitude of the error signal. A ring counter provides control pulses in response to the clock pulses, and these control pulses, along with logic gates, control the selection of the segments of the timing waveforms, as well as providing signals for the gate drivers.

BRIEF DESCRIPTION OF THE DRAWINGS

The invention may be better understood, and further advantages and uses thereof more readily apparent, when considered in view of the following detailed description of exemplary embodiments, taken with the accompanying drawings, in which:

FIG. 1 is a block diagram illustrating converter apparatus of the type which may utilize the teachings of the invention;

FIG. 2 is a schematic diagram of a selector, switching apparatus, and error amplifier which may be used for the block functions illustrated in FIG. 1;

FIG. 3 is a schematic diagram illustrating a modification of the selector shown in FIG. 2;

FIG. 12 is a schematic diagram of a gate driver circuit which may be used for the gate driver function shown in FIG. 1.

DESCRIPTION OF THE PREFERRED EMBODIMENTS

Figure 4:
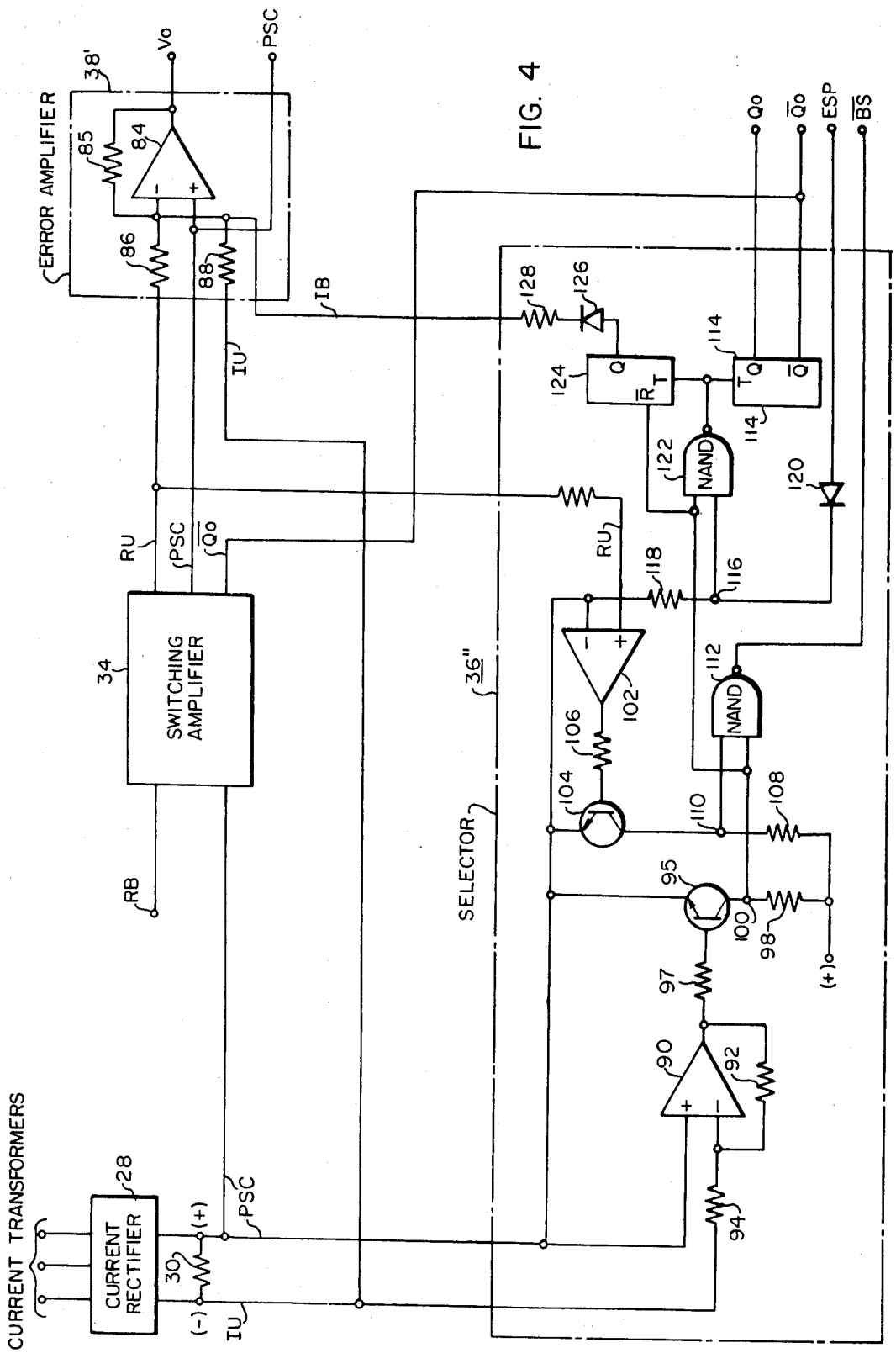
FIG. 4 is a schematic diagram which illustrates a modification of the selector shown in FIG. 3, and of the error amplifier shown in FIG. 2.

Referring now to the drawings, and FIG. 1 in particular, there is shown converter apparatus 10 for providing a controllable, reversible direct current for a load circuit 12 from a source 14 of alternating potential. While the source 14 is illustrated as being three-phase, having busses A, B, and C, it is to be understood that the source of alternating potential may be single-phase or polyphase.

Converter apparatus 10 includes first and second converter means 16 and 18, respectively, such as three-phase, full-wave bridge type rectifier arrangements, connected in parallel opposition. Half-wave rectification may also be used, if desired. Each of the converters includes a plurality of controlled rectifier devices connected to interchange electrical power between alternating and direct current circuits, represented by the source 14 and load circuit 12, respectively. Each bridge or converter, such as converter 16, includes six controlled rectifier devices, identified by the reference letters SCR with a number. The even numbers 2, 4 and 6 have their cathode electrodes interconnected, and the odd numbers 1, 3 and 5 have their anode electrodes interconnected. The controlled rectifier devices of converter 16 are similarly referenced, except with a prime mark. In order to simplify the drawing, each bridge is illustrated with its controlled rectifier devices arranged in the conventional manner. The devices are preferably arranged as illustrated in FIG. 5B of the hereinbefore mentioned U.S. Pat. 3,487,279 to enable certain suppression networks to be shared.

The dual bridge arrangement not only enables the magnitude of the direct current voltage applied to the load circuit 12 to be adjusted, by varying the conduction or firing angle of the controlled rectifier devices, and it allows the direction of the direct current flow through the load circuit to be reversed, by selectively operating the converter means. As illustrated, converter 16, when operational, provides a current flow I+ through the load circuit 12, which, for purposes of example, is termed forward current, and converter 18, when operational, provides a current flow I− through the load circuit 12, which is referred to as reverse current. The load circuit 12 may be a load which requires controllable, reversible direct current, such as the field or armature of a direct current drive motor.

Converter apparatus 10 is operated in a closed current loop mode, using current feedback to operate the converter essentially as a current amplifier. The current feedback for a dual converter is usually achieved by using a direct current transductor to monitor the output of each converter, with the outputs of the two transductors being summed to produce a bi-directional feedback signal; or, by using a set of A.C. current transformers to monitor the alternating input to each converter, with the outputs of the current transformers being rectified and summed to provide a bi-directional feedback signal. Both of these arrangements have disadvantages. The D.C. current transductor is complex, and requires external excitation. The A.C. current transformer approach, while basically more simple than the D.C. current transductor arrangement, and attractive because it does not require external excitation, increases the complexity of the converter apparatus because certain suppression networks must be provided for each converter.

U.S. Pat. 3,487,279 teaches the use of a single set of A.C. transformers, enabling the sharing of suppression networks, but does not use the resulting unidirectional current feedback signal to directly control the operation of the converter. Further, this patent discloses changing the polarity of this unidirectional feedback signal, when a predetermined one of the two converters is operating, before using the signal.

The present invention discloses new and improved converter apparatus which uses the unidirectional current feedback signal, without changing its polarity, as a current feedback signal for a closed current loop mode operation.

More specifically, the alternating current supplied by source 14 via busses A, B, and C to the dual converter is measured by current transformers 22, 24 and 26 disposed to provide a measure of the current flowing between the converter apparatus 16 and the source 14. The outputs of current transformers 22, 24 and 26 are appropriately summed and rectified by a current rectifier 28, which may be a three-phase, full-wave bridge rectifier, with the output terminals of a current rectifier 28 being connected to provide a unidirectional current feedback signal or voltage IU across a resistor 30. Unidirectional current feedback signal IU is proportional to the magnitude of the current flowing through the load circuit 12, regardless of the direction of the current flow through the load. For purposes of example, the positive terminal of resistor 30 will be used as the power supply common bus PSC, but the negative terminal may be used, as desired.

A bi-directional reference signal RB is provided by current reference 32, with the polarity of the bi-directional reference signal indicating in which direction the current should flow through the load circuit, i.e., which bridge should be operational, with the magnitude of the bi-directional reference signal indicating the desired magnitude of the load current. The current reference signal RB may be provided by an operator, a pattern generator, a computer, or the like.

The bi-directional reference signal RB is switched by switching means 34, in response to a switching signal $\bar{Q}_o$ to provide a substantially unidirectional reference signal RU. Intelligence for providing the switching signal $\bar{Q}_o$ for the switching means 34 is provided by selector means 36. Selector means 36 develops switching signal $\bar{Q}_o$, as well as the complement $Q_o$, through logic circuitry and predetermined system parameters, as will be hereinafter described.

The unidirectional reference signal RU and the unidirectional feedback signal IU are compared in comparator means 38, such as an error amplifier, and an error signal $V_c$ is developed which has a magnitude and polarity responsive to any difference between the two input signals.

The error signal $V_c$ is applied to a phase controller 40, which provides firing pulses FPI and FPII for converter means 16 and 18, respectively. The firing pulses control the conduction angle of the controlled rectifier devices in response to the error signal $V_c$. Bank reversal, and therefore selection of which converter should be operational, is responsive to the switching signals $Q_o$ and $\bar{Q}_o$. In order to maintain synchronism between the phase controller 40 and the converters 16 and 18, the conduction angle is maintained between predetermined limits or end stops, which will be referred to as rectification and inversion end stops. A signal ESP is provided by the phase controller when the inversion end stop is reached, which is applied to selector 36 in an embodiment of the invention, as will be hereinafter described. Selector 36 also provides a signal BS which forces an end stop condition, and a signal IB which biases the error amplifier 38, in certain embodiments of the invention.

The phase controller 40 includes a phase locked oscillator 42 and gate drivers 44. Separate gate drivers for converters 16 and 18 may be used for providing firing pulses FPI FPII for converters 16 and 18, respectively, driven by gate drive signals indicated generally with the reference GD; or, a single gate driver may be used, with its firing pulses being switched from one converter to the other, as desired.

Means 46 for developing timing waveforms TW for the phase controller, which waveforms are responsive to the line voltages of the source 14, is connected to the alternating current busses A, B and C.

FIG. 2 is a schematic diagram of a selector 36, switching amplifier 34, and error amplifier 38, constructed according to an embodiment of the invention which may be used for the block functions indicated by like reference numerals in FIG. 1. In this embodiment, the selector means 36 utilizes the current feedback signal IU and the unidirectional reference signal RU for developing the switch signals $Q_o$ and $\overline{Q}_o$.

More specifically, the switching amplifier 34 includes an operational amplifier 50, a first voltage divider comprising resistors 52 and 54, which are serially connected from input terminal RB to the power supply common conductor PSC, a second voltage divider comprising resistors 56 and 58 serially connected from input terminal RB to conductor PSC, and switching means 66. The junction 60 between resistors 52 and 54 of the first voltage divider is connected to the non-inverting input of operational amplifier 50, while the junction 62 between resistors 56 and 58 of the second voltage divider are connected to the inverting input. Resistors 52, 54, 56 and 58 are all of like value. A feedback resistor 64 is connected from the output of the operational amplifier to the inverting input thereof. Switching means 66 is connected from junction 60 to conductor PSC. When switching means 66 is conductive, the non-inverting input of operational amplifier 50 is connected directly to conductor PSC, and the output of operational amplifier 50 is proportional to the signal applied to input terminal RB, except with opposite sign. In other words, with switching means conductive, operational amplifier 50 functions as an inverting amplifier. When the switching means 66 is non-conductive, the output of the operational amplifier 50 follows both the magnitude and the sign of the input. The $\overline{Q}_o$ output of selector 36 is connected to the switching means 34 via resistor 68, and its logic level determines the conductive state of switching means 66.

Switching means 66 may, for example, include a transistor 70 of the PNP type, having an emitter electrode $e$ connected to a positive source of unidirectional potential, represented by input terminal 72, a collector electrode $c$ connected to a source of negative potential, represented by input terminal 74, via a resistor 76, and a base electrode $b$ connected to the positive source 72 via a resistor 78, and to the switching signal $\overline{Q}_o$ from selector 36, via a resistor 68. A field effect transistor 80 is provided, having a gate electrode G, a source S, and a drain D. The drain D is connected to conductor PSC, the source S is connected to junction 60, and the gate G is connected to the junction between the collector $c$ of transistor 70 and resistor 76 via a diode 82 which is poled to conduct current away from the gate G. When switching signal $\overline{Q}_o$ is at the logic one level, transistor 70 is cut-off and field effect transistor 80 is non-conductive. When switching signal $\overline{Q}_o$ is at the logic zero level, transistors 70 and 80 are both conductive.

When bi-directional reference signal RB is positive, the switching signal $\overline{Q}_o$ is a logic one, cutting off both transistors 70 and 80, and the output RU of operational amplifier 50 is also positive. When $\overline{Q}_o$ is a logic one, the gate drivers associated with converter 16 are enabled, and converter 16 is therefore operational. When the bi-directional reference signal RB decreases toward a negative quantity and crosses zero, RU will also be zero, and the switching signal $\overline{Q}_o$ switches to the logic zero level shortly thereafter, rendering both transistors 70 and 80 conductive. Thus, the output signal RU from operational amplifier 50 is now of a polarity which is opposite to the negative polarity of the input signal RB, and signal RU, even though it followed signal RB negative for a short time interval, is switched back to a positive polarity. When the bi-directional reference signal RB goes back to a positive polarity, transistors 70 and 80 are cut-off by the switching signal $\overline{Q}_o$ going back to a logic one, and the output of operational amplifier 50 follows the polarity of the input signal.

The unidirectional reference signal RU and the unidirectional current feedback signal IU are applied to the comparator means 38, and an error signal $V_c$ having a polarity and magnitude responsive to their relative magnitudes is developed. Comparator means 38 may include an operational amplifier 84 having a feedback resistor 85, with its inverting input connected to receive signals RU and IU via resistors 86 and 88, respectively, and its non-inverting input connected to conductor PSC. If the positive unidirectional reference signal RU exceeds the negative unidirectional feedback signal IU, the error signal $V_c$ is negative. If the positive unidirectional reference signal RU is less than the negative unidirectional feedback signal IU, the error signal $V_c$ is positive. If signals RU and IU are of like magnitude, the error signal $V_c$ will be zero.

The selector 36 for providing the switching signals for the switching amplifier 34, and also for bank reversal, includes means for (1) detecting when the load current is zero, i.e., when the unidirectional feedback signal IU is zero, and (2) when the unidirectional reference signal RU is zero or of changed polarity. Simultaneous occurrence of these two conditions is used to change the logic levels of the switching signals $Q_o$ and $\overline{Q}_o$.

More specifically, the means for detecting zero load current in selector 36 includes an operational amplifier 90 having a feedback resistor 92. The non-inverting input of operational amplifier 90 is connected directly to conductor PSC, and the inverting input is connected to conductor IU via resistor 94. A transistor 95 of the NPN type having base, emitter and collector electrodes $b$, $e$ and $c$, respectively, has its base electrode $b$ connected to the output of operational amplifier 90 via resistor 97, its collector electrode $c$ connected to a source of positive potential, indicated by terminal 96, via resistor 98, and its emitter electrode $e$ is connected to conductor PSC. As long as load current is flowing, signal IU will be above zero, and operational amplifier 90 provides base drive for transistor 95. Thus, the junction 100 between the collector electrode $c$ and resistor 98 is at the potential of the power supply common, which will be termed the logic zero level. When the feedback signal IU drops to zero, indicating zero load current flow, the transistor 95 loses its base drive and junction 100 increases in potential to what will be called the logic one level.

The means for detecting when the reference signal RU has dropped from a positive value to zero, or a negative value, includes an operational amplifier 102 and a transistor 104 of the NPN type having base, collector and emitter electrodes $b$, $c$ and $e$, respectively. The inverting input of operational amplifier 102 is connected to conductor PSC, its non-inverting input is connected to conductor RU via resistor 105, and its output is connected to the base electrode $b$ of transistor 104 via resistor 106. The collector electrode $c$ of transistor 104 is connected to source 96 of positive potential via resistor 108, and its emitter electrode $e$ is connected to conductor PSC. As long as reference signal RU is positive, operational amplifier 102 provides base drive for transistor 104, and the junction 110 between the collector electrode $c$ of transistor 104 and resistor 108 will be at the logic zero level. When signal RU is zero or negative, transistor 104 loses its base drive and junction 110 switches to the logic one level.

Simultaneous occurrence of logic one levels at junctions 100 and 110 is detected by NAND gate 112 which has inputs connected thereto, with the output of NAND gate 112 being switched to the logic zero level when its inputs are both "ones." This change in logic level from the "one" to the "zero" level triggers a JK flip-flop 114 to change the logic levels of its Q and $\bar{Q}$ outputs, to which output terminals $Q_o$ and $\bar{Q}_o$, respectively, are connected. Since the current zero will usually follow the occurrence of RU reaching zero, signal RU may be slightly negative by the time $\bar{Q}_o$ goes to logic zero to switch the signal RU positive again. This momentary negative polarity of signal RU is the reason signal RU is referred to as substantially unidirectional.

FIG. 3 is a schematic diagram which is similar to that shown in FIG. 2, except illustrating a modification of selector 36. The selector in FIG. 3 will be referred to as selector 36', to differentiate the modified selector. Like reference numerals in FIGS. 2 and 3 refer to like components. The modification includes a change in the circuit parameters which are selected to trigger the change in the logic levels of the switching signals $Q_o$ and $\bar{Q}_o$. Instead of using feedback signal IU and the substantially unidirectional reference signal RU to trigger the selector 36', the selector 36' is triggered in response to feedback signal IU being zero, and an end stop pulse ESP from the phase controller 40 shown in FIG. 1.

More specifically, when signal RB goes through zero and then negative from a positive quantity, reference signal RU follows it, which drives the error signal $V_c$ very positive in trying to reverse the current flow direction through the load, which the presently connected converter cannot do. The positive error signal retards the conduction angle until the inversion end stop is reached, at which time an end stop signal ESP is provided, i.e., signal ESP goes to a logic one. The input to NAND gate 112, instead of being connected to junction 110 as shown in FIG. 2, is now connected to receive the end stop pulse ESP. The end stop pulse ESP is connected to conductor PSC via a serially connected diode 120 and resistor 118, with an input of NAND gate 112 being connected to the junction 116 between the resistor 118 and the diode 120. Thus, selector 36' provides a switching signal $\bar{Q}_o$ for switching amplifier 34, which returns the reference signal RU to a positive polarity when it starts to go negative, and switching signals $Q_o$ and $\bar{Q}_o$ for the phase controller which effects bank reversal, when the load current is zero and the conduction angle has been driven to the inversion end stop.

The inversion end stop pulse ESP may occur several hundred milliseconds after load current zero, which is undesirable in certain applications, as this dead time represents a period during which the converter is not following the reference signal, and at the end of the dead band the reference signal may already have an appreciable magnitude resulting in a step increase in the load current provided by the on-coming converter. However, it is desirable to use the end stop pulse ESP as the trigger for bank reversal, as it insures that the controlled rectifier devices of the converter which has been supplying current are fully turned off before triggering controlled rectifier devices in the on-coming converter.

FIG. 4 is a schematic diagram of a selector 36'' which illustrates a modification of the selectors 36 and 36' shown in FIGS. 2 and 3, which modification permits the end stop pulse ESP to trigger bank reversal and the switching amplifier, while reducing the dead time to only about 8–16 milliseconds. Like reference numerals in FIGS. 2, 3 and 4 indiciate like components.

More specifically, NAND gate 112 is connected to junctions 100 and 110, as disclosed in FIG. 2, providing the logic zero signal when signal IU is zero, and when signal RU is zero or negative. However, instead of triggering bank reversal and operating the switching amplifier 34, the output of NAND gate 112 is connected to the phase controller 40 shown in FIG. 1, via an output terminal $\overline{BS}$. Signal $\overline{BS}$, when at the logic zero level, biases or forces the phase controller more rapidly to the inversion end stop, than it normally would proceed. Then, when the inversion end stop pulse ESP is received, it is used, along with the zero load current signal from junction 100, to switch the switching amplifier and also effect bank reversal. A NAND gate 122 is provided for this function, having its inputs connected to junctions 100 and 116, and its output to the trigger input of JK flip-flop 114.

When the signal requesting bank reversal is provided by selector 36'', a bias signal IB is also provided by selector 36'' which biases the input to the error amplifier to provide an error signal $V_c$ which more rapidly advances the conduction angle away from the inversion end stop, reducing the time required for the on-coming converter to provide load current. When load current is detected, the bias signal IB is terminated.

These functions are provided by using the output of NAND gate 122 to trigger another JK flip-flop 124. The Q output of flip-flop 124 goes high when triggered by the low output of NAND gate 122, with the output of flip-flop 124 being connected to bias the inverting input of operational amplifier 84 via diode 126 and resistor 128, driving the error signal $V_c$ negative at a rapid rate, and advancing the conduction angle rapidly away from the inversion end stop. Junction 100 is connected to the reset input $\bar{R}$ of flip-flop 124, resetting the flip-flop and removing the bias signal IB when the on-coming converter provides load current and drives junction 100 to the logic zero level. Thus, the dead time is substantially reduced, by forcing the phase controller rapidly to the inversion end stop, and then rapidly away from the inversion end stop, substantially reducing the time during which no load current flows during bank reversal.

Figure 5:
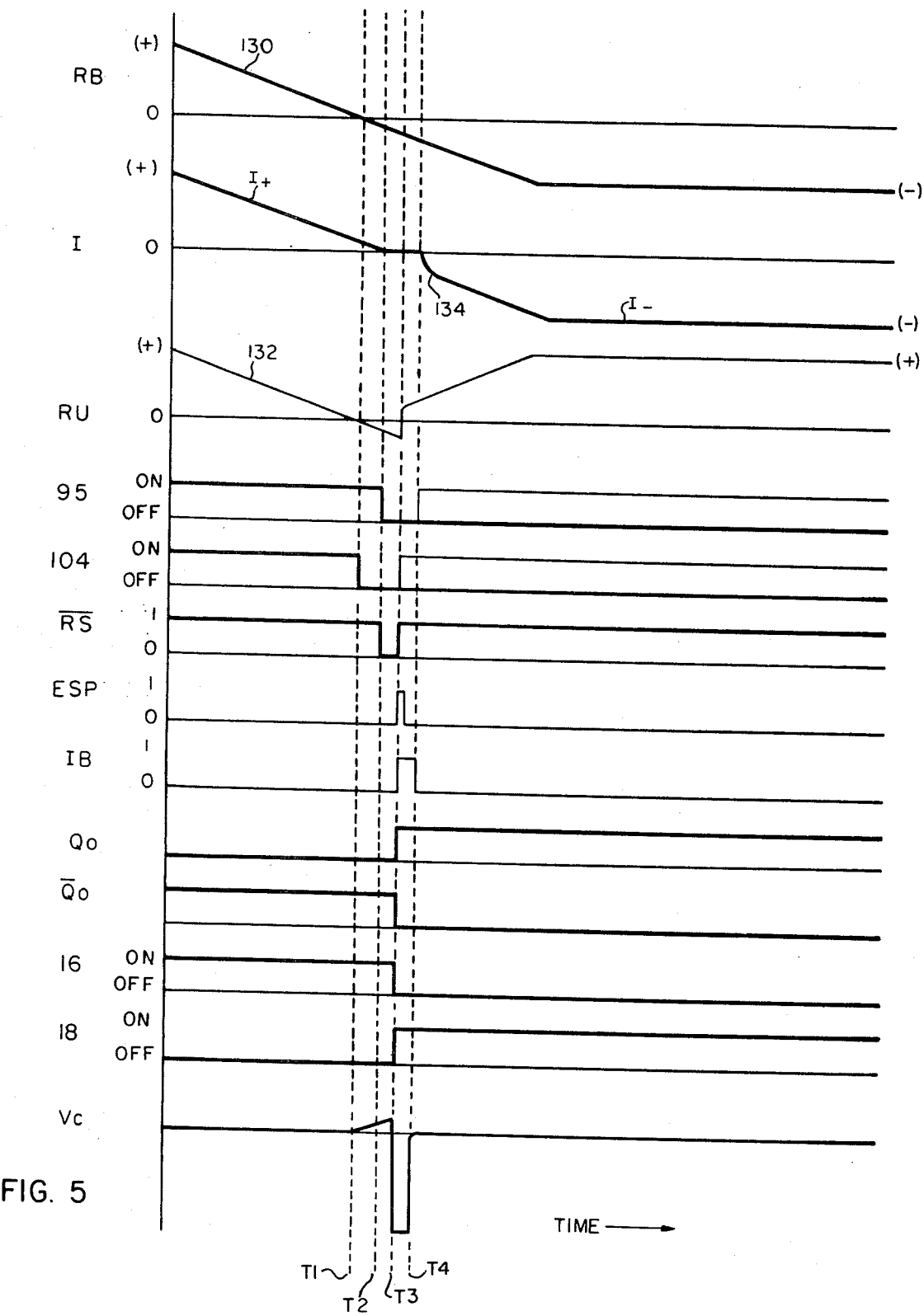
FIG. 5 is a graph explanatory of the operation of the converter apparatus shown in FIG. 1 using the selector shown in FIG. 4.

FIG. 5 is a graph which illustrates the various functions of selector 36'' and the affect of the selector 36'' on the operation of the converter apparatus 10. For purposes of illustration, it will be assumed that the bi-directional reference signal RB is positive and decreasing along curve portion 130 toward a negative quantity. At time T1, reference signal RB crosses zero and then becomes negative. The substantially unidirectional reference signal RU follows the bi-directional reference signal RB along a similar curve portion 132, also crossing zero at time T1 and becoming negative. Transistor 104 also turns off at time T1, and the error signal $V_c$ starts to increase in a positive direction. The load current I follows the bi-directional reference signal RB closely, crossing zero at a time T2, shortly after time T1. The load current I now remains at zero until the other bank is operational Transistor 95 turns off at time T2. The combination of both transistors 95 and 104 being off provides a low $\overline{BS}$ signal, forcing the phase controller to its inversion end top at time T3, generating a high ESP signal at time T3. The high ESP signal, along with transistor 95 being non-conductive, switches the logic states of switching signals $Q_o$ and $\bar{Q}_o$. The low $\bar{Q}_o$ signal switches the reference signal RU positive at time T3, this turns on transistor 104 and terminates the signal $\overline{BS}$. Converter 16 is effectively disconnected and converter 18 turned on. The bias signal IB is generated, and the error signal $V_c$ is driven negative. At time T4, load current I is provided by the on-coming converter 18, transistor 95 is turned on, terminating the bias signal IB, and the error signal $V_c$ returned to its unbiased value. The dead time from time T2 to time T4 during which no load current is flowing is reduced to 8–16 milliseconds, which substantially reduces the magnitude of the step 134 in the load current I, compared with the magnitude of the step in the load current which would result with a dead time of several hundred milliseconds.

Figure 6:
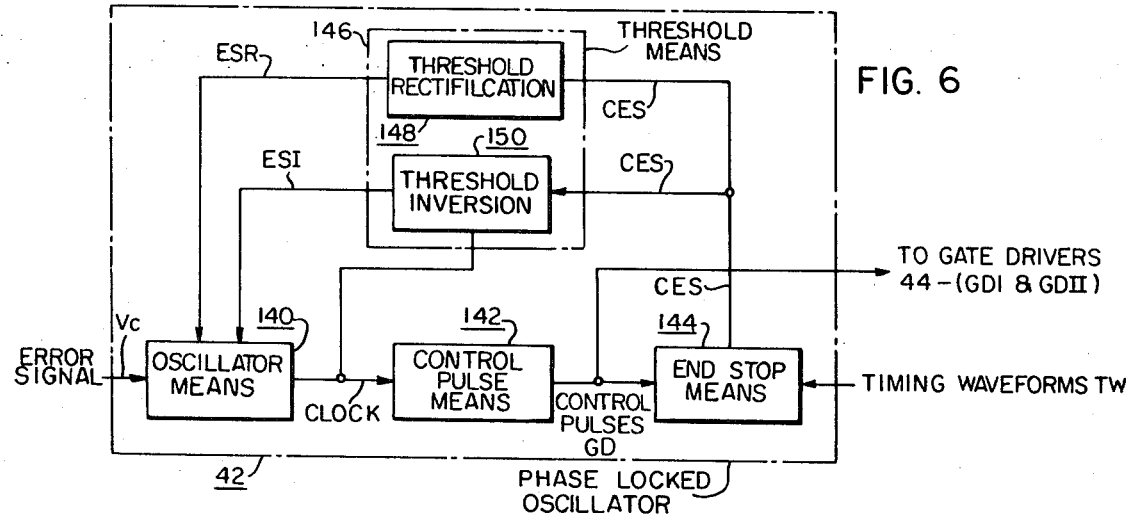
FIG. 6 is a block diagram of a phase locked oscillator constructed according to the teachings of the invention.

FIG. 6 is a block diagram of a new phase locked oscillater 42 which may be used in the phase controller 40 shown in FIG. 1, to provide signals GDI and GDII for the gate drivers 44. Phase locked oscillator 42 includes oscillator means 140 of the type which provides an output clock rate responsive to the magnitude of the error signal $V_c$. The oscillator means 140 is adjusted such that an error signal of zero magnitude provides a predetermined clock rate, selected to be a predetermined multiple of the frequency of source 14 of alternating potential. A negative error signal increases the clock rate from this predetermined magnitude, and a positive error signal reduces the clock rate.

The output of oscillator 140 is applied to control pulse means 142. Control pulse means 142 produces spaced control pulses in response to the clock pulses with their spacing determining the conduction angle of the controlled rectifier devices in the selected converter bank. The control pulses are applied to the gate drivers 44, and are the same signals as those referred to with the letters GDI and GDII shown in FIG. 1.

The control pulses are also applied to end stop means 144, which, along with the timing waveforms TW, develop a composite end stop signal CES made up of segments of the timing waveforms. The segments of the timing waveforms which are selected depend upon the location and spacing of the control pulses with respect to the timing waveforms TW. When the locations of the control pulses with respect to the timing waveforms TW are such that the peaks or crests of the timing waveforms are selected, and the composite end stop signal CES has its greatest magnitude. If the error signal $V_c$ changes from zero in the negative direction, increasing the clock rate of the oscillator means 140, and thus reducing the spacing between the control pulses, the segments of the timing waveforms which are selected move down from the crest on the leading or left-hand edge of the timing sine wave, thus reducing the magnitude of the composite end stop signal CES. If the error signal changes from zero in the positive direction, decreasing the clock rate of the oscillator means 140, and thus increasing the spacing between the control pulses, the segments of the timing waveforms which are selected move down from the crest on the trailing or right-hand sides of the timing waveforms TW, also reducing the magnitude of the composite end stop signal CES.

The composite end stop signal CES is applied to threshold means 146, which includes a threshold circuit 148 for detecting the rectification end stop, i.e., when the conduction angle advances to a predetermined angle, and a threshold circuit 150 for detecting the inversion end stop, i.e., when the conduction angle retards to a predetermined angle. When the rectification end stop is reached, the threshold circuit 148 provides a signal ESR for the oscillator means 140, which signal reduces the rate of the clock to the predetermined rate corresponding to an error signal of zero magnitude. When the inversion end stop is reached, the threshold circuit 150 provides a signal ESI for the oscillator means 140, which signal increases the rate of the clock to the predetermined rate corresponding to an error signal of zero magnitude. Thus, the phase controller 40 remains in synchronism with the power converter, assuring proper converter operation.

Figure 7:
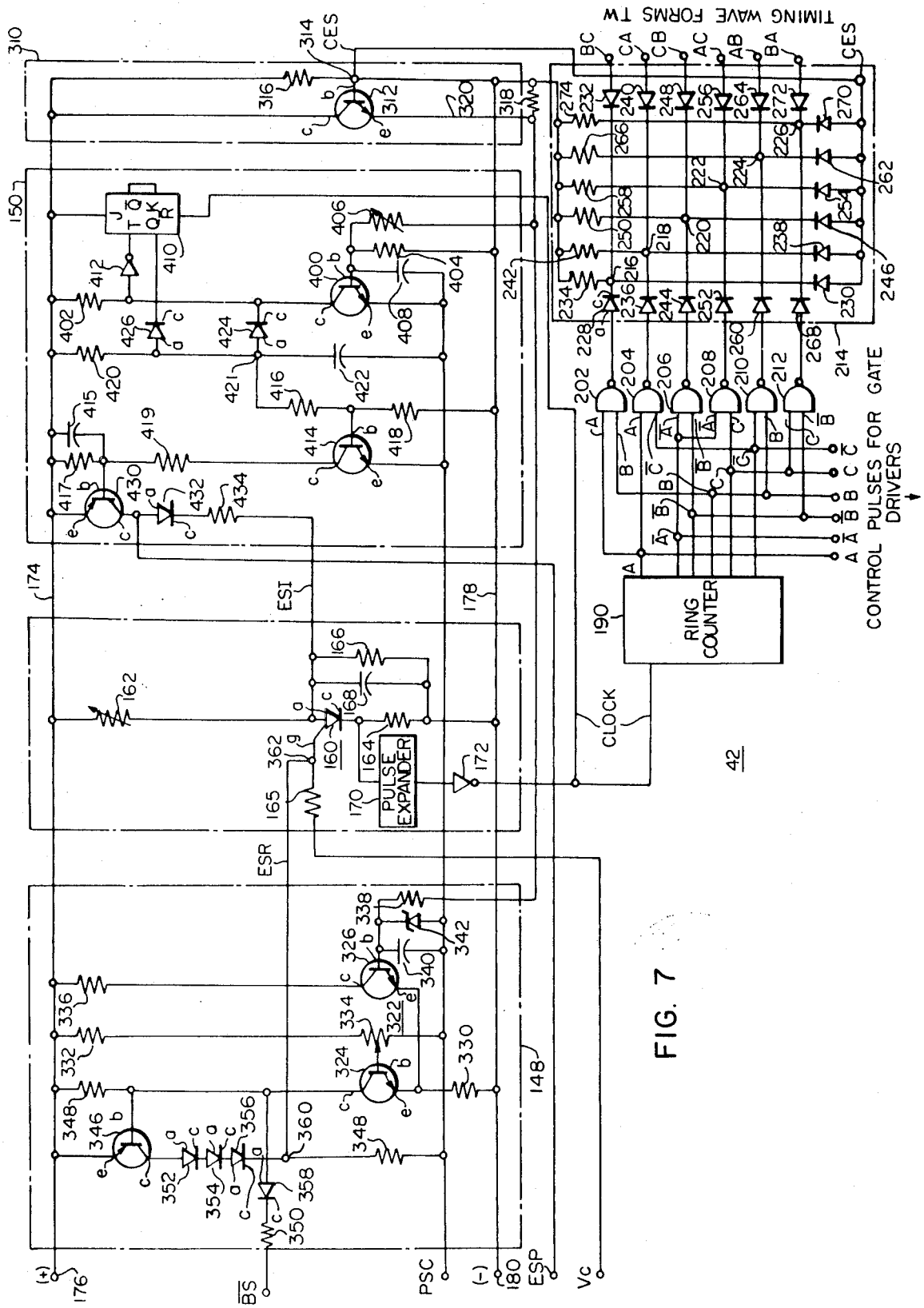
FIG. 7 is a schematic diagram of the phase locked oscillator shown in FIG. 6, constructed according to the teachings of the invention.

FIG. 7 is a schematic diagram of a phase locked oscillator 42 which performs the block functions illustrated in FIG. 6. The oscillator 140 includes a programmable unijunction transistor 160, hereinafter referred to as PUT 160, and adjustable resistor 162, fixed resistors 164, 165 and 166, a capacitor 168, a pulse stretcher or expander 170, and an inverter or NOT gate 172. The PUT 160 includes anode, cathode and gate electrodes $a$, $c$ and $g$, respectively, and is connected with the resistors and capacitor to provide a relaxation oscillator. The anode electrode $a$ is connected to a conductor 174 and input terminal 176 via adjustable resistor 162, and input terminal 176 is connected to a source of positive unidirectional potential. Its cathode electrode $c$ is connected to a conductor 178 and input terminal 180, via resistor 164, and input terminal 180 is connected to a source of negative unidirectional potential. Its gate electrode $g$ is connected to input terminal $V_c$ via resistor 165, with input terminal $V_c$ receiving the error signal $V_c$ from the error amplifier 38'.

Since the PUT 160 is turned on when the gate electrode $g$ is negative with respect to the anode by slightly more than the diode offset voltage, the magnitude of the voltage applied to the gate electrode $g$ controls the rate of the voltage pulses which appear across the load resistor 164. These pulses, which have a steep rise due to the very short turn on time of the PUT 160, are stretched to a uniform width by the pulse stretcher 170, and the stretched pulses are inverted by NOT gate 172 such that the uniform stretch time is at the logic zero level, and the variable time is at the logic one level. The output of NOT gate 172 provides the system CLOCK.

The clock rate is adjusted by adjustable resistor 162, when the error signal $V_c$ is zero, to provide a rate which is a predetermined multiple of the frequency of the source of alternating potential. The predetermined multiple depends upon whether the source is single or polyphase, and upon whether the bridge converters are full-wave or half-wave rectifiers. With a three-phase, 60 Hz. supply, and a three-phase, full-wave bridge rectifier for the converters 16 and 18, six firing channels are required for a converter, and the prescribed multiple is 6. Thus, the clock rate is 60 x 6 or 360 Hz. With three-phase, half-wave bridge rectifiers, the multiple would be 3, and the clock rate would be 180 Hz. With a single-phase, full-wave bridge, the multiple would be 2, and the clock rate would be 120 Hz. Thus, in the disclosed example, resistor 162 would be adjusted such that with a zero error signal $V_c$, the clock rate would be 360 Hz.

Control pulses GD for the gate drivers 44 are provided by a ring counter 190. Ring counter provides three logic square waves A, B and C, which are displaced by 120 electrical degrees when the error signal $V_c$ is zero, and their complements $\overline{A}$, $\overline{B}$, and $\overline{C}$.

Figure 8:
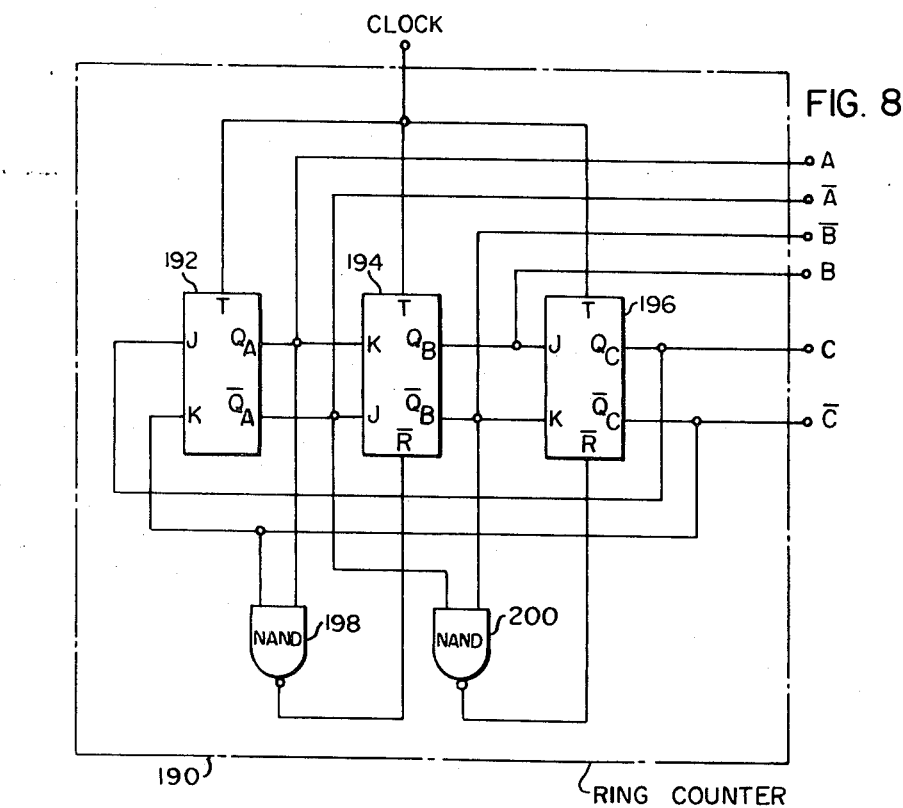
FIG. 8 is a schematic diagram of a ring counter which may be used in the phase locked oscillator shown in FIG. 6.

FIG. 8 is a schematic diagram of a ring counter which will provide the desired control pulses GD. First, second and third JK flip-flops 192, 194 and 196 are provided, which trigger on the trailing edge of the clock pulse. The clock is connected to the trigger inputs T of the three JK flip-flops. The $Q_a$ and $\overline{Q}_a$ outputs of flip-flop 192 are connected to K and J inputs, respectively of flip-flop 194, the $Q_b$ and $\overline{Q}_b$ outputs of flip-flop 194 are connected to the J and K inputs, respectively, of flip-flop 196, and the $Q_c$ and $\overline{Q}_c$ outputs of flip-flop 196 are connected to the J and K inputs, respectively, of flip-flop 192. Since this arrangement has eight possible states, and only six states are used, first and second NAND gates 198 and 200 are provided to force the ring counter 190 from a disallowed state, if it develops, into a permitted state. NAND gate 198 has its inputs connected to the $Q_a$ and $\overline{Q}_c$ outputs, and its output is connected to the reset input $\overline{R}$ of flip-flop 194. Thus, if the A and $\overline{C}$ outputs are both "one," flip-flop 194 is immediately reset. NAND gate 200 has its inputs connected to the $\overline{Q}_a$ and $\overline{Q}_b$ outputs, and its output is connected to the reset input $\overline{R}$ of flip-flop 196. Thus, if the $\overline{A}$ and $\overline{B}$ signals are both "one," flip-flop 196 is immediately reset.

The control pulses A, $\overline{A}$, B, $\overline{B}$, C and $\overline{C}$ are used, along with the timing waveforms TW to develop a composite end stop signal CES. The timing waveforms TW are developed from the three-phase source of alternating potential 14, via means 46, which may include three center tapped windings connected line-to-line. A timing waveform is thus developed from each center tap to the two lines associated with each winding, providing timing waveforms CA, CB, AB, AC, BC, and BA, successively displaced from one another by 60 electrical degrees.

The control pulses A, $\overline{A}$, B, $\overline{B}$, C, and $\overline{C}$ are used to successively select segments of the timing waveforms via six logic or NAND gates 202, 204, 206, 208, 210, and 212, and an auctioneering circuit 214. Auctioneering circuit 214 includes six terminals 216, 218, 220, 222, 224 and 226, with each terminal having three diodes and a resistor connected thereto. Terminal 216 has the cathode electrodes of three diodes 228, 230 and 232 connected thereto, along with a resistor 234. Terminal 218 has three diodes 236, 238 and 240 connected thereto, along with a resistor 242. Terminal 220 has diodes 244, 246 and 248 connected thereto, along with a resistor 250. Terminal 222 has diodes 252, 254 and 256 connected thereto, along with a resistor 258. Terminal 224 has diodes 260, 262 and 264 connected thereto, along with a resistor 266. Terminal 226 has diodes 268, 270 and 272 connected thereto, along with a resistor 274.

The anode electrodes of diodes 228, 236, 244, 252, 260 and 268 are connected to the outputs of NAND gates 202, 204, 206, 208, 210 and 212, respectively. The anode electrodes of diodes 230, 238, 246, 254, 262 and 270 are connected to output terminal CES, which provides the composite end stop signal CES. Diodes 232, 240, 248, 256, 264 and 272 are connected to input terminals BC, CA, CB, AC, AB, and BA, respectively, which receives a timing waveform with the same reference letters, and the remaining ends of resistors 234, 242, 250, 258, 266 and 274 are connected to negative bus 178.

NAND gate 202 has its inputs connected to outputs A and B of ring counter 190, NAND gate 204 has its inputs connected to outputs A and $\overline{C}$, NAND gate 206 has its inputs connected to outputs $\overline{A}$ and $\overline{B}$, NAND gate 208 has its inputs connected to outputs $\overline{A}$ and C, NAND gate 210 has its inputs connected to outputs $\overline{C}$ and B, and NAND gate 212 has its inputs connected to outputs C and $\overline{B}$.

Only one of the NAND gates connected to the ring counter 190 has a low or logic zero output at any one time. The logic one outputs of the other NAND gates provide a logic level higher than the peak voltage of the timing waveforms, measured to the common conductor PSC. For example, the logic one output level may be 15 volts, while the peak voltage of the timing waveforms to conductor PSC may be 10 volts. The voltage at output terminal CES of auctioneering circuit follows the most negative voltage applied to terminals 216, 218, 220, 222, 224 and 226. Thus, the timing waveform appearing at output terminal CES is that timing waveform which has an associated NAND gate with a logic zero output.

Figure 9:
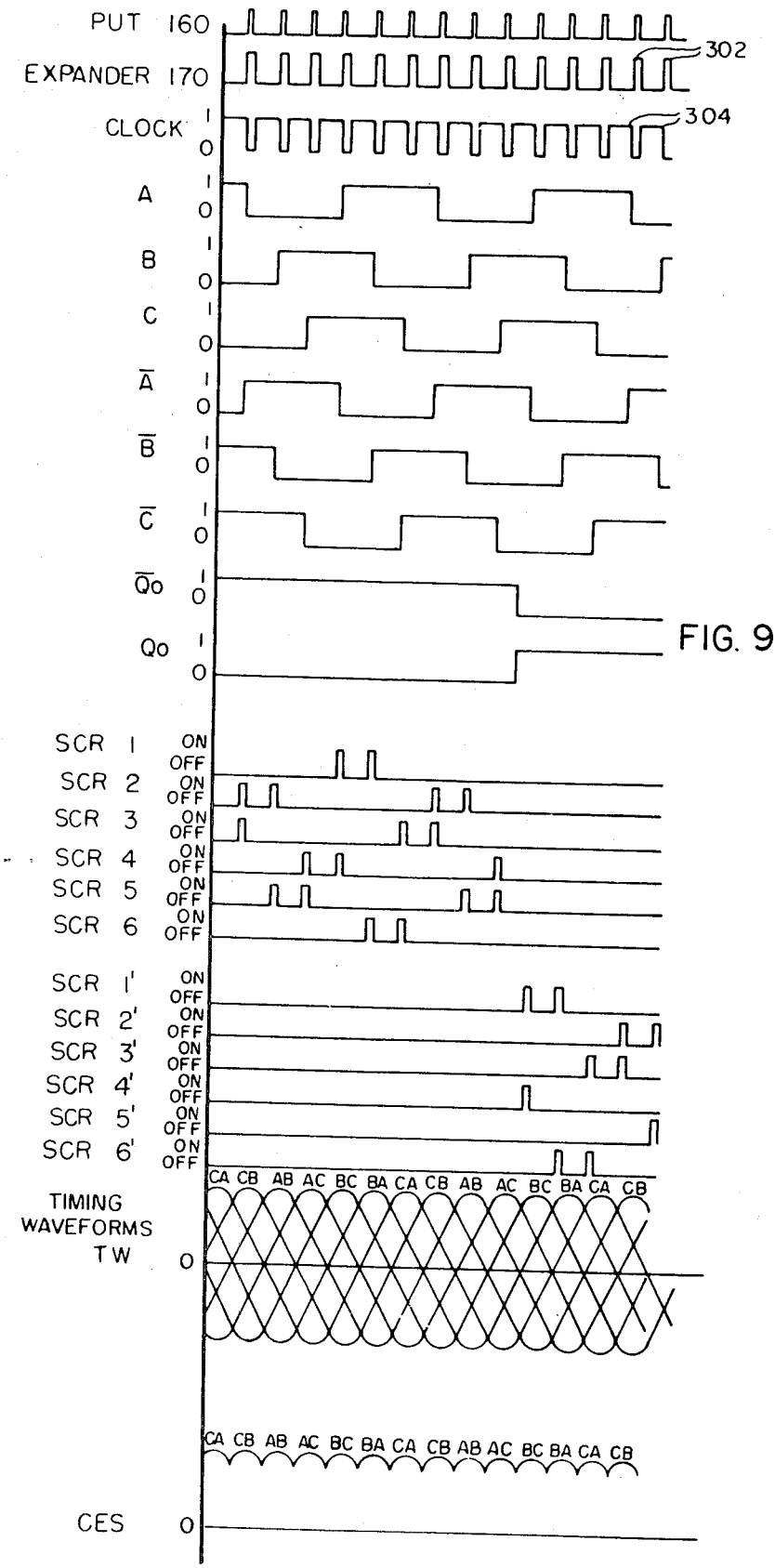
FIG. 9 is a graph explanatory of the operation of a phase locked oscillator shown in FIG. 6, including certain waveforms and the operation of certain circuit functions in response thereto, which are instrumental in developing the composite end stop signal for an error signal of zero magnitude.

Before describing how the composite end stop signal CES is used to generate the rectification and inversion end stops, it will be helpful to refer to FIG. 9, which is a graph which illustrates the development of certain of the signals in the phase locked oscillator 42. The output signals 300 are generated by the PUT 160 across resistor 164, and the pulse expander 170 stretches the pulses or signals 300 to provide signals 302 having a uniform "on" time. Pulses 302 are inverted by NOT gate 172 to provide clock pulses 304, which have a fixed logic zero time, and a variable logic one time.

The ring counter provides the spaced square wave pulses A, B, C, $\overline{A}$, $\overline{B}$, and $\overline{C}$, with a pulse being terminated and another initiated by the trailing edge of each clock pulse 304. For example, at the end of the first clock pulse, signal A is terminated and signal $\overline{A}$ is generated, at the end of the next pulse signal B is generated and signal $\overline{B}$ is terminated. Each pulse lasts for three clock pulses before being terminated. Signals $\overline{Q}_0$ and $Q_0$ represent the switching signals provided by the bank selector 36 shown in FIG. 1. The development of the firing pulses from the output of the ring counter for controlling the firing of the controlled rectifier devices is also illustrated, and will be hereinafter referred to when a gate drive circuit which may be used is explained. The timing waveforms TW, which include waveforms CA, CB, AB, AC, BC and BA, is next illustrated, and the composite end stop signal CES is then illustrated. FIG. 9 illustrates a clock rate for an error signal of zero magnitude, with the conduction angle being $\pi/3$. Thus, the segments of the timing waveforms TW which are selected to make up the composite end stop waveforms CES are the positive peaks of the timing waves, i.e., 30° on each side of each positive peak.

The composite end stop signal CES is applied to the rectification and inversion threshold circuits 148 and 150, respectively, via a buffer amplifier 310. The purpose of a buffer amplifier 310 is to minimize the loading on the composite end stop signal CES by the threshold circuits 148 and 150. Buffer amplifier 310 includes a transistor 312 of the NPN type, having its collector electrode $c$ connected to conductor 174, and its base electrode $b$ connected to the junction 314 of a resistive voltage divider which includes a resistor 316 connected between conductor 174 and junction 314. The end stop signal CES from auctioneering circuit 214 is connected to the base electrode $b$ at junction 314, with the remaining portion of the resistive voltage divider including the resistors in the auctioneering circuit 214. The emitter electrode $e$ of transistor 312 is connected to the rectification and inversion threshold circuits 148 and 150 via conductor 320, and also the conductor 178 via resistor 318.

The rectification end stop circuit 148 includes a comparator 322 comprising first and second transistors 324 and 326 of the NPN, resistors 328, 330, 332, 334, 336 and 328, a capacitor 340, and a voltage regulating diode 342, such as a Zener diode. Transistor 324 has its collector electrode C connected to conductor 174 via resistor 328, its emitter electrode $e$ connected to conductor 178 via resistor 330, and its base electrode $b$ connected to a voltage divider which includes resistors 332 and 334 serially connected between conductor 174 and the power supply common conductor PSC. Resistor 334 may be adjustable, with the base electrode $b$ connected to the selector arm thereof.

Transistor 326 has its collector electrode $c$ connected to conductor 174 via resistor 336, its emitter electrode $e$ connected to the emitter electrode $e$ of transistor 324, and its base electrode $b$ connected to the conductor 320 from the buffer amplifier 310 via resistor 338. Capacitor 340 and voltage regulating diode 342 are connected from the base electrode $b$ of transistor 326 to the conductor PSC, with the voltage regulating diode 342 having its cathode electrode $c$ connected to the base electrode $b$, and its anode electrode $a$ connected to conductor PSC. Diode 342 limits the positive voltage of the emitter of transistor 326 so the maximum reverse base-emitter voltage of transistor 324 is not exceeded.

The rectification end stop circuit 148 also includes a transistor 346 of the PNP type, resistors 348 and 350, and diodes 352, 354, 356 and 358. The emitter electrode $e$ of transistor 346 is connected to conductor 174, diodes 352, 354 and 356 are serially connected from the collector electrode $c$ of transistor 346 to a junction 360. Junction 360 is connected to conductor PSC via resistor 348, and also to the junction 362 between the gate electrode $g$ of the PUT 160 of oscillator 140 and resistor 165, via conductor ESR. Conductor ESR provides the rectification end stop signal ESR when transistor 346 conducts and develops a voltage across resistor 348 equal to the magnitude of the positive source voltage connected to input terminal 176 less the voltage drop across diodes 352, 354 and 356.

The base electrode b of transistor 346 is connected to the collector electrode c of transistor 324, and also, via diode 358 and resistor 350 to input terminal $\overline{BS}$, which is connected to selector 36" shown in FIG. 4. Diode 358 is poled such that its anode electrode a is connected to the base electrode b of transistor 346.

Figure 10:
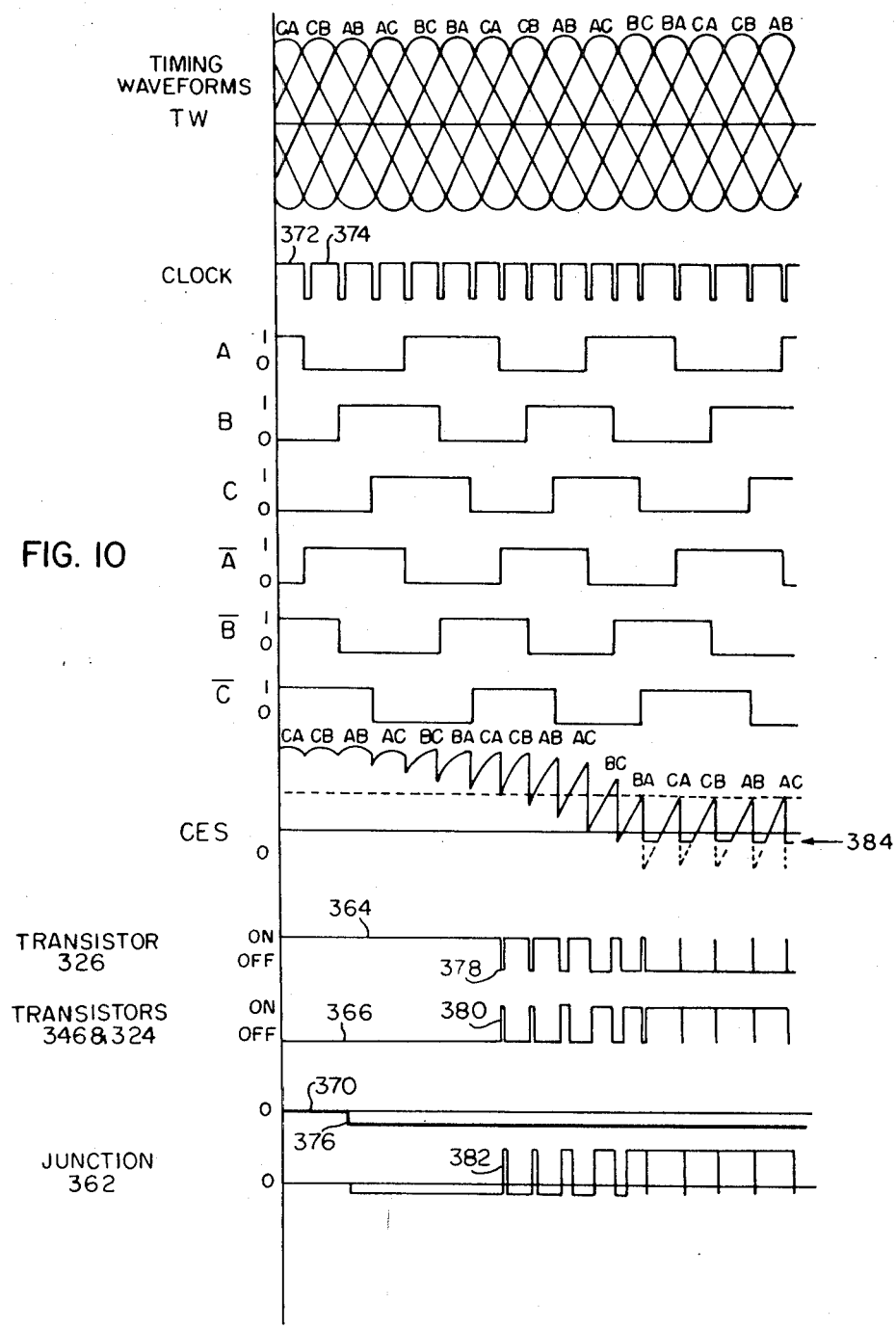
FIG. 10 is a graph which illustrates certain waveforms and the operation of certain circuit functions in response thereto, including the development of the composite end stop signal for a conduction angle which advances to the rectification end stop.

In describing the operation of the rectification threshold circuit 148 which provides the rectification end stop, the graph shown in FIG. 10 will be referred to.

With an error signal $V_c$ of zero magnitude, illustrated at 370 in FIG. 10, and a forcing angle of $\pi/3$, the clock pulses 372 and 374 are positioned with respect to their associated timing waveform CA and CB such that the peaks of these waveforms are selected for the composite end stop signal CES. The composite end stop signal CES provides a higher positive voltage for transistor 326 of comparator 322 than the voltage provided by the selected setting on adjustable resistor 334 for transistor 324 of the comparator. Thus, transistor 326 is conductive, illustrated at 364, and transistors 324 and 346 are nonconductive, as illustrated at 366. Assume now that it is desired to increase the load voltage, i.e., the error signal $V_c$ becomes negative at 376, which drives junction 362 and the gate electrode g of PUT 160 negative, increasing the clock rate of oscillator 140. The control pulses A, B, C, $\overline{A}$, $\overline{B}$, and $\overline{C}$ thus advance with respect to the timing waveforms, the firing angle advances from $\pi/3$, and the segments of the timing waveforms which are selected for the composite end stop signal CES start to move down from the peaks of the timing waveforms,, on the leading edges thereof. Waveforms AB, AC, BC, and BA progressively dip to lower and lower magnitudes, and waveforms CA reaches the rectification threshold voltage level TR, set by adjustable resistor 334, FIG. 7. Transistor 326 turns off at 378 and transistors 324 and 376 turn on at 380. When transistor 346 turns on in response to comparator 322, junction 360, and thus junction 362 at the gate of PUT 160 goes high at 382. The clock rate continues to increase, however, even though the threshold voltage TR is reached, as the PUT is only inhibited from producing an output pulse while the end stop signal CES is below the level of TR. As long as signal CES returns above level TR in time to provide the clock rate responsive to the magnitude of the error signal, the clock rate will continue to increase and the firing angle will continue to advance. The true rectification end stop is thus not when the end stop voltage CES dips to the level TR, but when the clock rate reaches a point where the end stop voltage is below level TR when the oscillator 140 would normally produce a pulse, delaying the production of a pulse until the instantaneous value of signal CES increases above the threshold level TR. In FIG. 10, the rectification end stop is reached at waveform BA. The waveforms CA, CB, AB and AC which follow waveform BA delay generation of a pulse until level TR is exceeded. Since the same point of each timing waveform is now reached before a clock pulse is initiated, it follows that the clock rate is returned to the same rate as when the error signal was zero, to hold the clock rate at the rectification end stop, regardless of how negative the error signal $V_c$ becomes. The firing angle thus stays at the value corresponding to the selected rectification end stop threshold TR, until the error signal $V_c$ goes positive.

As illustrated in FIG. 10, the composite end stop signal CES need not follow the timing waveforms on their negative excursions, indicated by the dotted lines, thus limiting the magnitude of the negative potential presented to the outputs of the NAND gates associated with the ring counter 190. This "cutting off" of the negative portions of the timing waveforms to a predetermined level, indicated by arrow 384, is accomplished by properly selecting the ratio of resistor 316 to the resistors 234, 242, 250, 258, 266 and 274. When resistor 316 is larger than the values of the resistors in the auctioneering circuit 214, the negative excursion is limited. A practical ratio has been found to be achieved when resistor 316 is 18.2 k., and the resistors in the auctioneering circuit are 15 k., but other values may be used.

If the feedback signal from the converter apparatus now calls for operation away from the rectification end stop, toward the inversion end stop, the error signal becomes positive allowing the composite end stop signal CES to ride up the timing waveforms past the rectification threshold level TR. When the desired converter operation is reached, the error signal $V_c$ will become zero, and the clock rate will return to the rate which maintains the control pulse rate the same as the rate of the timing waveforms.

When the signal $\overline{BS}$ goes low, indicating that the converter should be forced to an inversion end stop, transistor 346 is turned on, regardless of the level of the error signal $V_c$, inhibiting the oscillator 140 from generating a clock pulse until the inversion end stop is reached, as will be hereinafter described. When transistor 346 is turned on by signal $\overline{BS}$, the comparator 322 is overridden, and except for the negative excursions as hereinbefore described, the composite end stop signal follows the particular timing waveform that it was locked in on at the time the $\overline{BS}$ signal went to logic zero, until the inversion end stop is reached, greatly reducing the time normally required to reach the inversion end stop.

The inversion threshold circuit 150 for providing the inversion end stop includes a transistor 400 of the NPN type, resistors 402, 404 and 406, and a capacitor 408. The collector electrode c of transistor 400 is connected to conductor 174 via resistor 402, its emitter electrode e is connected to conductor PSC, the capacitor 408 is connected from the base electrode b to conductor PSC, resistor 404 is connected from the base electrode b to conductor 178, and the base electrode b of transistor 400 is also connected to conductor 320 via resistor 406, and thus to the buffer amplifier 310. Resistor 406 is adjustable to provide a threshold level TI which sets the inversion end stop.

A JK flip-flop 410 is provided, which has its trigger input T connected to the collector electrode c of transistor 400 via an inverter or NOT gate 412. Its J input is connected to conductor 174, its $\overline{Q}$ and K inputs are interconnected, and its reset input $\overline{R}$ is connected to the clock.

A transistor 414 of the NPN type is provided, along with resistors 416, 417, 418, 419 and 420, a capacitor 422, and diodes 424 and 426. The collector electrode c of transistor 414 is connected to conductor 174 via serially connected resistors 419 and 417, its emitter electrode e is connected to conductor PSC, and its base electrode b is connected to a resistive voltage divider which includes serially connected resistors 420, 416, and 418, which are connected in the recited sequence from conductor 174 to conductor 178. The base electrode b is connected to the junction between resistors 416 and 418. The capacitor 422 is connected to the junction 421 between resistors 420 and 416, with the other side of capacitor 422 being connected to conductor PSC. Diodes 424 and 426 have their anode electrodes a connected to junction 421, with the cathode electrode c of diode 424 being connected to the collector electrode c of transistor 400, and with the cathode electrode c of diode 426 connected to the Q input of JK flip-flop 410.

A transistor 430 of the PNP type is also provided, along with a capacitor 415, a diode 432, and a resistor 434. The emitter electrode e of transistor 430 is connected to conductor 174, its base electrode b is connected to the junction between resistors 417 and 419, capacitor 415 is connected from the base electrode b to conductor 174, and its collector electrode c is connected to the anode electrode a of the PUT 160 via diode 432 and resistor 434. This connection to oscillator 140 from the inversion end stop circuit 150 provides the inversion end stop signal ESI. The output terminal ESP which provides the inversion end stop signal ESP when the inversion end stop is reached, hereinbefore referred to when describing FIGS. 3 and 4, is also connected to the collector of transistor 430.

Figure 11:
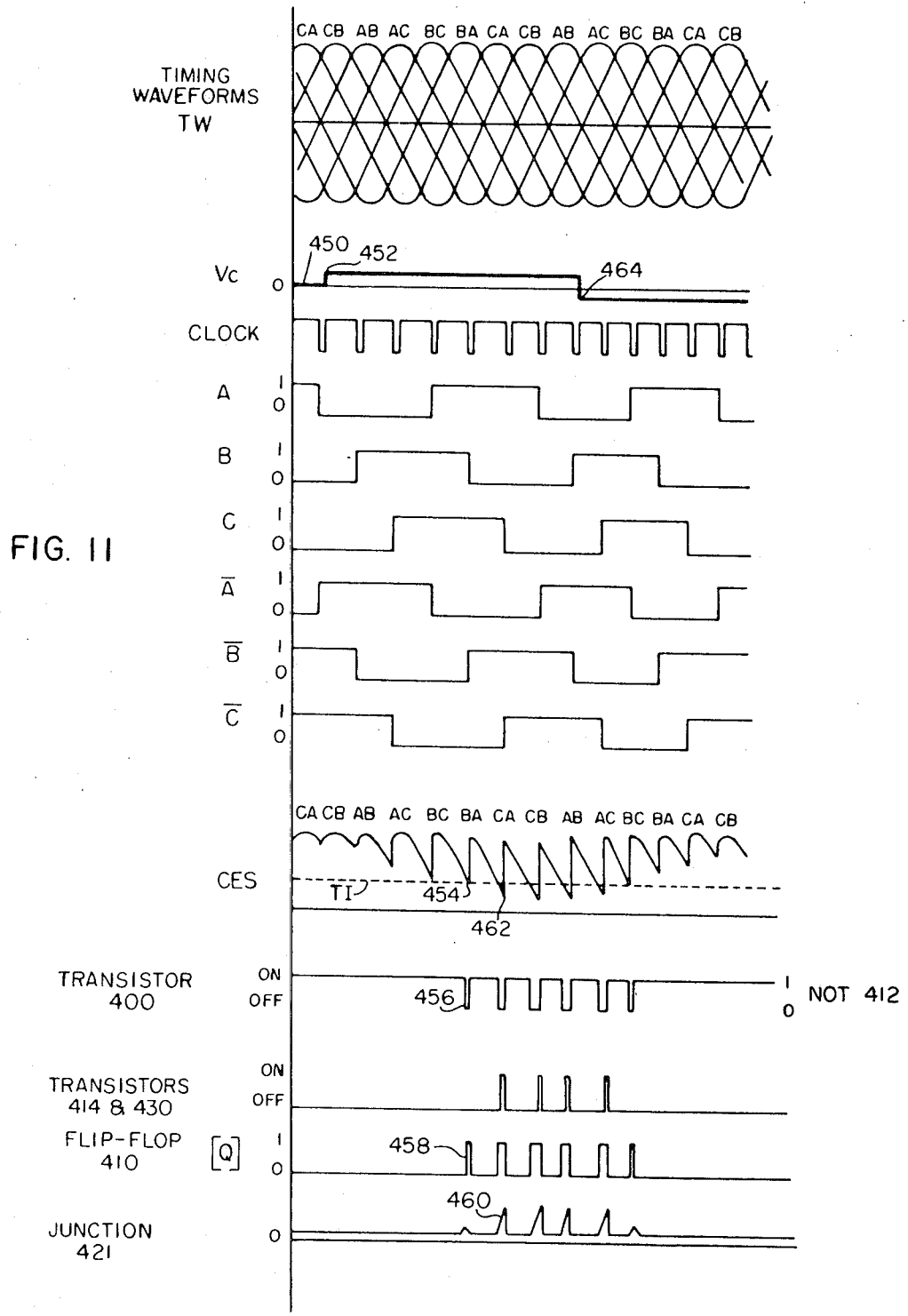
FIG. 11 is a graph similar to that shown in FIG. 10, except illustrating the development of the composite end stop signal for a conduction angle which retards to the inversion end stop.

In describing the operation of the inversion end stop circuit 150, the graph shown in FIG. 11 will be referred to. It will be assumed that the error signal $V_c$ starts at zero, illustrated at 450, with the segments of the timing waveforms which are selected for the composite end stop signal CES being the peaks thereof, i.e., the conduction angle is $\pi/3$. Assume now that it is desired to decrease the load voltage, i.e., the error signal $V_c$ becomes positive at 452. The clock rate provided by oscillator 140 is decreased, and the control pulses from the ring counter 190 retard, with respect to the timing waveforms. The segments selected for the composite end stop signal CES start to move down the trailing edges of the timing waveforms from their former positions at the peaks thereof. When the end stop signal CES drops to the threshold level TI, as illustrated at 454, transistor 400 switches from a conductive state to a non-conductive state at 456. When transistor 400 switches off, the output of NOT gate 412 drops from a logic one to a logic zero, triggering flip-flop 410. When flip-flop 410 triggers, output Q goes high at 458 and capacitor 422 starts to charge with a predetermined RC time constant, indicated with reference numeral 459. If the composite end stop does not remain below the threshold level TI for a time sufficient to charge the capacitor to a predetermined magnitude, which time may be about 100 microseconds, the junction 421 will not reach the voltage level required to render transistor 414 conductive, and thus transistor 430 is not switched to its conductive state. This time delay, provided by the charging of capacitor 422, makes the operation insensitive to voltage spikes on the timing waveforms which have a duration of less than 100 microseconds, which might otherwise produce false operation.

The next segment (BA) of the timing waveform CES remains below the TI level for the time required to charge capacitor 422 to the voltage necessary to switch transistor 414 to its conductive state and transistor 430 to its conductive state. This is indicated at 460. When transistor 430 conducts, the current applied to the anode electrode $a$ of PUT 160 forces it to produce an output pulse which advances the ring counter one step. The resulting clock pulse, which is applied to the reset input $\bar{R}$ of flip-flop 410 resets the Q output of flip-flop 410 to the logic zero state, which turns off transistors 414 and 430. Thus, the composite end stop signal CES drops below the threshold level TI, indicated at 462 only for the time required to charge capacitor 422 to the voltage level necessary to switch transisitors 414 and 430 to their conductive states, and then the clock pulse is forced, which resets the inversion threshold circuit. Since the clock pulse now occurs at the same point on successive waveforms, the forced clock rate is the same rate as for an error signal of zero magnitude, retaining the operation of the converter at the firing angle corresponding to the selected inversion end stop.

If the error signal becomes negative, as indicated at 464, the clock rate increases, and the waveform of the composite end stop signal CES starts to ride up to waveforms toward their crest, as indicated, and the firing angle advances away from the inversion end stop.

There is no interference between the two end stop circuits. When the conduction angle is advancing toward the rectification end stop, if the inversion threshold level TI is reached and transistor 400 is cut-off, triggering flip-flop 410, will be immediately reset by the clock pulse going to the zero state, to provide a zero output from its Q output, and the inversion threshold circuit is thus ineffective.

When the conduction angle is retarding toward the inversion end stop, and junction 360 is driven high due to the composite end stop signal CES dropping to the threshold level TR, the voltage applied to the gate electrode $g$ of PUT 160 by conductor ESR will be several volts lower than the voltage which is forcing current into the anode electrode $a$ of PUT 160, due to the voltage drop across the serially connected diodes 352, 354 and 356. Thus, when transistor 430 conducts, it will still force the PUT 160 to provide an output pulse. The signal $\overline{BS}$ which forces the circuit to an inversion end stop is similarly overcome once the inversion end stop is reached and transistor 430 conducts to force an output pulse.

FIG. 12 is a schematic diagram of a gate driver circuit 44 which may be used to provide the function with the same reference numeral shown in FIG. 1. FIG. 12 illustrates a firing channel for each controlled rectifier of each of the bridge rectifier circuits. However, only half as many channels would be required if the gate driver were to be arranged such that it is switched from one converter to the other, as required.

More specifically, firing channels 500, 502, 504, 506, 508 and 510 are illustrated for controlled rectifiers SCR1, SCR3, SCR5, SCR6, SCR2, and SCR4, respectively of converter bridge 16. Channels 512, 514, 516, 518, 520 and 522 are illustrated for controlled rectifiers SCR1', SCR3', SCR5', SCR6', SCR2', and SCR4', respectively, for converter bridge 18. Quad input NAND gates 524, 526, 528, 530, 532, 534, 536, 538, 540, 542, 544, and 546 are provided for the channels 500, 502, 504, 506, 508, 510, 512, 514, 516, 518, 520 and 522, respectively.

The clock input terminal is connected to an input of each of the NAND gates via an inverter or NOT gate 548. An input terminal $\bar{Q}_0$ from the output of selector 36 is connected to an input of each of the NAND gates 524, 526, 528, 530, 532 and 534 which are associated with converter 16, and an input terminal $Q_0$ from the output of selector 36 is connected to an input of each of the C and $\bar{C}$, which receive control pulses from the ring counassociated with converter 18. Input terminals A, $\bar{A}$, B, $\bar{B}$, C and C, which receive control pulses from the ring counter 190 are connected to select the proper controlled rectifier to which a firing pulse is to be delivered. Input terminal A is connected to inputs of NAND gates 524, 530, 536 and 542, input terminal $\bar{A}$ is connected to inputs of NAND gates 528, 532, 540 and 544, input terminal $\bar{B}$ is connected to inputs of NAND gates 526, 530, 538 and 542, input terminal B is connected to inputs of NAND gates 528, 534, 540 and 546, input terminal C is connected to inputs of NAND gates 524, 534, 536 and 546, and input terminal $\bar{C}$ is connected to inputs NAND gates 526, 532, 538 and 544.

Since each of the channels are of like construction, only channel 500 is illustrated in FIG. 12. Channel 500 includes a transistor 550 of the NPN type, a pulse transformer 552 having primary and secondary windings 554 and 556, respectively, resistors 558, 559 and 560, diodes 562, and 564, and voltage regulating diodes 566 and 568, such as Zener diodes. The collector electrode $c$ of transistor 550 is connected to a terminal 571 via the primary winding 554 of transformer 552 and resistor 558. Terminal 571 is connected to a source of positive unidirectional potential (not shown). The secondary winding 556 of pulse transformer 552 is connected to output terminals G and K which are connected to the gate and cathode electrodes, respectively, of controlled rectifier device SCR1. The collector electrode $c$ is also connected to the anode electrode $a$ of diode 562. The cathode electrode $c$ of diode 562 is connected to the cathode electrode $c$ of voltage regulating diode 566. The voltage regulating diode 566 may be used to limit the collector-emitter voltage of transistors in the other channels by connecting the cathode of diode 566 to the counterparts of diode 562 in the other channels. The emitter electrode $e$ of transistor 550 is connected to conductor PSC, and to the anode electrode $a$ of voltage regulating diode 566. The base electrode $b$ is connected to the output of NAND gate 524 via voltage regulating diode 568 and diode 564. Voltage regulating diode 568 has its anode electrode *a* connected to the base electrode *b* of transistor 550, and its cathode electrode *c* is connected to the anode electrode *a* of diode 564. A positive source of unidirectional potential is connected to the junction between the cathode and anode electrodes of diodes 568 and 564 via resistor 559, and a negative source of unidirectional potential is connected to the anode electrode *a* of voltage regulating diode 568 via resistor 560.

In the operation of channel 500, when the output of NAND gate 524 is high, transistor 550 is conductive and current flows through the primary winding 554 of the pulse transformer 552. When all of the inputs to NAND gate 524 are at the logic one level, its output goes to logic zero and transistor 550 becomes non-conductive. The current in the primary winding 554 is then transferred into the secondary winding 556, and this pulse fires the controlled rectifier SCR1. The NAND gate arrangement shown in FIG. 12 provides firing pulses for the controlled rectifiers of the converter 16 and 18, as illustrated in FIG. 9.

In summary, there has been disclosed new and improved converter apparatus having a power converter and phase controller. The phase controller includes end stop means which utilizes a single composite end stop signal to control both the rectification and inversion end stops, assuring that the phase controller and power converter remain in synchronism.

We claim as our invention:

1. Converter apparatus, comprising:
a source of alternating potential,
means providing a plurality of timing waveforms responsive to said source of alternating potential,
a load circuit,
converter means having controlled rectifier devices connected to interchange electrical energy between said source of alternating potential and said load circuit,
means providing a feedback signal responsive to a predetermined parameter of said converter means,
means providing a reference signal indicative of the desired operation of said converter means,
means providing an error signal in response to said feedback and reference signals,
phase controller means controlling the conduction angle of said controlled rectifier devices in response to said error signal,
said phase controller means including end stop means for maintaining synchronous operation between said phase controller means and said converter means by constraining the conduction angle between first and second end stops,
said end stop means providing a composite end stop signal in response to said timing waveforms and the conduction angle, said composite end stop signal being formed of segments of said timing waveforms, with the segments selected being determined by the conduction angle,
said end stop means including first and second threshold means responsive to said composite end stop signal for providing said first and second end stops, respectively.

2. The converter apparatus of claim 1 wherein the phase controller includes oscillator means providing a predetermined clock rate responsive to an error signal of zero magnitude, and higher and lower rates for negative and positive error signals, and including means responsive to the clock rate for controlling the conduction angle of the controlled rectifier devices.

3. The converter apparatus of claim 2 including means returning the clock rate of the oscillator means to the predetermined rate when the conduction angle reaches an end stop.

4. The converter apparatus of claim 2 wherein the predetermined clock rate is a predetermined multiple of the frequency of the source of alternating potential.

5. The converter apparatus of claim 2 including means providing an inhibiting signal when the conduction angle reaches the first end stop, which inhibits the oscillator means from providing a clock signal until the composite end stop signal reaches a first predetermined magnitude.

6. The converter apparatus of claim 2 including means providing a forcing signal when the conduction angle reaches the second end stop, with the forcing signal being provided each time the end stop signal drops below a second predetermined magnitude, said forcing signal being applied to said oscillator means which generates a pulse in response thereto.

7. The converter apparatus of claim 6 wherein the means which forces the oscillator means to generate a pulse signal includes means responsive to the length of time the composite end stop signal is below the second predetermined magnitude, with said means providing the forcing signal only when the composite end stop signal is below the second predetermined magnitude for a predetermined period of time.

8. Converter apparatus, comprising:
a source of alternating potential,
a load circuit,
converter means having controlled rectifier devices connected to interchange electrical energy between said source of alternating potential and said load circuit,
feedback means providing a feedback signal responsive to a predetermined parameter of said converter means,
reference means providing a reference signal indicative of the desired operation of said converter means,
comparator means providing an error signal responsive to said feedback and reference signals,
means providing a plurality of timing waveforms in response to said source of alternating potential,
and phase controller means response to said error signal and said timing waveforms for controlling the conduction angle of the controlled rectifier devices,
said phase controller means including oscillator means, control pulse means, driver means, end stop means, and threshold means,
said oscillator means providing clock signals at a predetermined rate in response to an error signal of zero magnitude, and higher and lower rates at error signal magnitudes on predetermined opposite sides of zero,
said control pulse means providing control pulses in response to said clock signals,
said driver means providing gate drive signals for said controlled rectifier devices in response to said control pulses,
said end stop means being responsive to said control pulses and said timing waveforms, providing a composite end stop signal made up of segments of said timing waveforms, with the segments selected being responsive to the rate of said control signals,
and said threshold means providing signals for said oscillator means in response to said composite end stop signal, which signals constrain the conduction angle of the controlled rectifier devices between predetermined limits.

9. The converter apparatus of claim 8 wherein the threshold means includes first and second threshold circuits for setting the limits of the conduction angle.

10. The converter apparatus of claim 8 wherein the predetermined rate of the clock pulses in response to an error signal of zero magnitude is a predetermined multiple of the frequency of the source of alternating potential.

11. The converter apparatus of claim 8 wherein the signal provided by the threshold means when a predetermined limit is reached modifies the oscillator means to provide clock signals at the predetermined rate.

12. The converter apparatus of claim 8 wherein the threshold means includes a first threshold circuit, said first threshold circuit providing an inhibiting signal which inhibits the oscillator means from providing a clock signal once a predetermined conduction angle is reached, while the end stop signal is below a predetermined threshold magnitude.

13. The converter apparatus of claim 12 wherein the threshold means includes a second threshold circuit, said second threshold circuit providing a forcing signal which forces the oscillator means to generate a clock signal, once a predetermined conduction angle is reached, each time the end stop signal drops to a predetermined second threshold magnitude.

14. The converter apparatus of claim 13 wherein the second threshold means includes means responsive to the length of time the end stop signal drops below the second threshold magnitude, with the second threshold means providing the forcing signal only when the length of time the composite end stop signal is below the second threshold magnitude exceeds a predetermined interval.

15. The converter apparatus of claim 8 wherein the control pulse means is a ring counter.

16. The converter apparatus of claim 8 wherein the oscillator means includes a programmable unijunction transistor having anode, cathode and gate electrodes, with the error signal being applied to the gate electrode thereof.

17. The converter apparatus of claim 8 wherein the end stop means includes logic gates responsive to the control pulses, and auctioneering means responsive to the output of said logic gates and said timing waveforms, said auctioneering means selecting segments from the timing waveforms to provide the composite end stop signal in response to the outputs of said logic gates.

References Cited

UNITED STATES PATENTS

| | | | |
|---|---|---|---|
| 3,308,368 | 3/1967 | Schmidt, Jr. | 321—27 R X |
| 3,391,327 | 7/1968 | Pelly | 321—27 R |
| 3,407,348 | 10/1968 | Lawrence et al. | 321—27 R |
| 3,487,279 | 12/1969 | Stringer et al. | 318—257 |
| 3,543,118 | 11/1970 | Koenig | 318—257 X |
| 3,593,104 | 7/1971 | Fisher et al. | 321—69 R X |
| 3,654,541 | 4/1972 | Kelly, Jr. et al. | 321—27 R X |
| 3,675,110 | 7/1972 | Kelly, Jr. | 321—27 R X |

WILLIAM M. SHOOP, JR., Primary Examiner

U.S. Cl. X.R.

321—5, 18; 318—257